(12) United States Patent
Song

(10) Patent No.: US 10,400,861 B2
(45) Date of Patent: Sep. 3, 2019

(54) SPEED REDUCER FOR VEHICLE

(71) Applicant: Mando Corporation, Pyeongtaek-si, Gyeonggi-do (KR)

(72) Inventor: Seok Ki Song, Anyang-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 15/637,382

(22) Filed: Jun. 29, 2017

(65) Prior Publication Data

US 2018/0003268 A1    Jan. 4, 2018

(30) Foreign Application Priority Data

Jun. 30, 2016    (KR) ........................ 10-2016-0083092

(51) Int. Cl.
| | | |
|---|---|---|
| *F16H 1/48* | (2006.01) | |
| *F16H 55/22* | (2006.01) | |
| *F16H 57/12* | (2006.01) | |
| *B62D 5/04* | (2006.01) | |
| *F16H 57/00* | (2012.01) | |

(Continued)

(52) U.S. Cl.
CPC ............. *F16H 1/48* (2013.01); *B62D 5/0409* (2013.01); *F16H 1/16* (2013.01); *F16H 1/225* (2013.01); *F16H 35/06* (2013.01); *F16H 55/14* (2013.01); *F16H 55/22* (2013.01); *F16H 55/24* (2013.01); *F16H 57/0006* (2013.01); *F16H 57/12* (2013.01); *H02K 7/081* (2013.01); *H02K 7/1166* (2013.01); *H02K 11/21* (2016.01); *F16H 2057/0213* (2013.01);

(Continued)

(58) Field of Classification Search
CPC ... F16H 1/16; F16H 1/225; F16H 1/48; F16H 35/06; F16H 55/14; F16H 55/22; F16H 55/24; F16H 57/0006; F16H 57/12; F16H 2057/02021; F16H 2057/0213; F16H 2057/123; H02K 7/081; H02K 11/21; H02K 2205/03; B62D 5/0409
USPC ............ 74/388 PS, 409, 427, 440, 500, 724; 180/443, 444, 446
See application file for complete search history.

(56) References Cited

U.S. PATENT DOCUMENTS

| | | | |
|---|---|---|---|
| 3,001,414 A | * | 9/1961 | Bourne .................. F16H 25/20 409/146 |
| 9,102,349 B2 | * | 8/2015 | Sandholzer .......... B62D 5/0409 |

(Continued)

FOREIGN PATENT DOCUMENTS

| | | | | |
|---|---|---|---|---|
| DE | 4010162 A1 | * | 10/1991 | ............. F16H 55/24 |
| JP | 04029664 A | * | 1/1992 | ............. F16H 55/24 |

*Primary Examiner* — Victor L MacArthur
*Assistant Examiner* — Joseph Brown
(74) *Attorney, Agent, or Firm* — Hauptman Ham, LLP

(57) ABSTRACT

The speed reducer includes: a gear housing to enclose a worm wheel and a worm shaft and including one of a first magnetic member and a second magnetic member, which generate attractive force or repulsive force therebetween as current is applied to a position facing the worm shaft in an axial direction; a first bearing coupled to an end of the worm shaft at an opposite side to a motor shaft-coupling portion; and a moving member coupled, at one side thereof, to an outer race of the first bearing and including, at a remaining side thereof, a remaining one of the first and second magnetic members, so that the moving member is axially moved according to the attractive force or the repulsive force.

14 Claims, 10 Drawing Sheets

(51) Int. Cl.
    *F16H 35/06*     (2006.01)
    *F16H 55/14*     (2006.01)
    *F16H 1/16*     (2006.01)
    *F16H 1/22*     (2006.01)
    *F16H 55/24*     (2006.01)
    *H02K 7/116*     (2006.01)
    *H02K 7/08*     (2006.01)
    *H02K 11/21*     (2016.01)
    *F16H 57/02*     (2012.01)
    *F16H 57/021*     (2012.01)

(52) U.S. Cl.
    CPC .............. *F16H 2057/02021* (2013.01); *F16H 2057/123* (2013.01); *H02K 2205/03* (2013.01)

(56) References Cited

U.S. PATENT DOCUMENTS

2005/0279562 A1* 12/2005 Hara ...................... B62D 5/003
    180/402
2009/0252549 A1* 10/2009 Takeuchi ................ F16D 1/087
    403/298

* cited by examiner

SPEED REDUCER FOR VEHICLE

CROSS REFERENCE TO RELATED APPLICATION

This application claims priority from Korean Patent Application No. 10-2016-0083092, filed on Jun. 30, 2016, which is hereby incorporated by reference for all purposes as if fully set forth herein.

BACKGROUND OF THE INVENTION

1. Field of the Invention

The present invention relates to a speed reducer for a vehicle, and more particularly, to a speed reducer for a vehicle (hereinafter, referred to as a "vehicular speed reducer"), in which even if a clearance exists between a worm shaft and a worm wheel, the clearance between the worm shaft and the worm wheel is removed at the time of motor driving, so that noise, which is generated when the worm shaft collides with the teeth of the worm wheel during the rotation thereof, can be prevented from being generated, vibration, which is transmitted to the worm wheel due to vibration of the worm shaft, is reduced and rattling noise is reduced, so that an uncomfortable feeling of a driver can be eliminated, and the worm wheel and the worm shaft are stably engaged with each other, so that torque can be smoothly transmitted.

2. Description of the Prior Art

FIG. 1 is a cross-sectional view illustrating a conventional vehicular speed reducer. As illustrated in FIG. 1, a conventional vehicular speed reducer 100 is provided with a worm shaft 154 on which the worm gear 152 is formed, and worm shaft bearings 157 are respectively installed at the opposite ends of the worm shaft 154 so as to support the worm shaft 154. In order to prevent the worm shaft bearings 157 from being loosened in the axial direction of the worm shaft 154, a plug bolt 110 is fastened between a damping coupler 140 and the worm shaft bearings 157, and the plug bolt 110 is fixed by a plug nut 120.

The worm shaft 154 is connected with the motor 146 via the damping coupler 140, and is configured to be rotated by the driving of the motor 146.

In addition, a worm wheel 156 is provided on the outer diameter of the worm gear 152 such that the worm wheel 156 can be engaged with the worm gear 152 formed on the worm shaft 154. The worm wheel 156 is mounted on the steering shaft 106, which transmits torque of a steering wheel (not illustrated) operated by a driver, so that the torque of the worm shaft 154, which is generated by the driving of the motor 146, is transmitted to the steering shaft 106.

The worm gear 152, the worm wheel 156, and so on run within a gear housing 160, and the motor 146 is provided on one side of the gear housing 160 so as to provide driving force to the worm shaft 154. The gear housing 160 and the motor 146 are coupled to each other by a motor cover 130 using a bolt 150.

The vehicular speed reducer configured as described above is configured such that the driving of the motor is controlled by an electronic control unit provided in the vehicle depending on the state of travel of the vehicle and such that the torque of the worm shaft, which is applied by the driving of the motor, is transmitted to the steering shaft in addition to the torque of the steering wheel operated by the driver, so that the driver's steering operation can be performed smoothly and stably.

However, in the conventional vehicular speed reducer, the torque transmission between the worm shaft and the worm wheel is not smoothly performed due to a clearance between the worm shaft and the worm wheel, and the torque of the worm shaft and the worm wheel is changed depending on the traveling state of the vehicle, which may cause inconvenience to the driver. More over, due to vibration and impact caused by the clearance, the teeth of the worm shaft and the worm wheel may be worn or damaged.

SUMMARY OF THE INVENTION

The present invention has been made under the above-described background, and the present invention provides a vehicular speed reducer, in which even if a clearance exists between a worm shaft and a worm wheel, the clearance between the worm shaft and the worm wheel is removed at the time of motor driving, so that noise, which is generated when the worm shaft collides with the teeth of the worm wheel during the rotation, can be prevented from being generated, vibration, which is transmitted to the worm wheel due to vibration of the worm shaft, is reduced and rattling noise is reduced, so that an uncomfortable feeling of a driver can be eliminated, and the worm wheel and the worm shaft are stably engaged with each other, so that torque can be smoothly transmitted.

The object of the present invention is not limited to those described above, and other objects, which are not described above, may be clearly understood by a person ordinarily skilled in the art from the following description.

According to the present invention, there is provided a vehicular speed reducer. The vehicular speed reducer includes: a gear housing configured to enclose a worm wheel and a worm shaft and including one of a first magnetic member and a second magnetic member, which generate attractive force or repulsive force as current is applied to a position facing the worm shaft in an axial direction; a first bearing coupled to an end of the worm shaft at an opposite side to a motor shaft-coupling portion; and a moving member coupled, at one side thereof, to an outer race of the first bearing and including, at a remaining side thereof, a remaining one of the first and second magnetic members, so that the moving member is axially moved according to the attractive force or the repulsive force.

According to the present invention as described above, even if a clearance exists between a worm shaft and a worm wheel, the clearance between the worm shaft and the worm wheel is removed at the time of motor driving, so that noise, which is generated when the worm shaft collides with the teeth of the worm wheel during the rotation thereof, can be prevented from being generated, vibration, which is transmitted to the worm wheel due to vibration of the worm shaft, is reduced and rattling noise is reduced, so that an uncomfortable feeling of a driver can be eliminated, and the worm wheel and the worm shaft are stably engaged with each other, so that torque can be smoothly transmitted.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
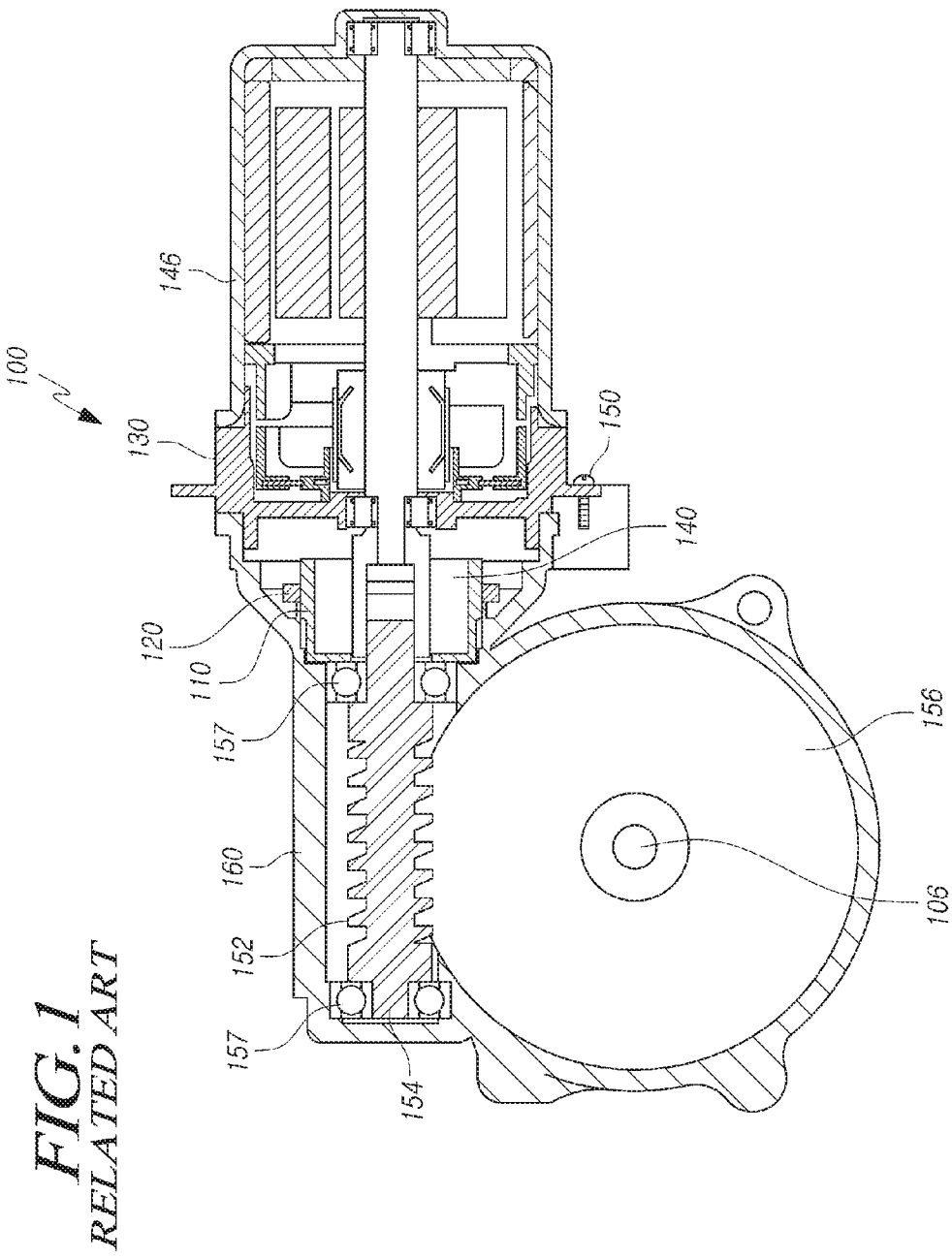
FIG. 1 is a cross-sectional view illustrating a conventional vehicular speed reducer.

Hereinafter, embodiments of the present invention will be described in detail with reference to the accompanying drawings. In adding reference numerals to elements in each drawing, it should be noted that the same elements are designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
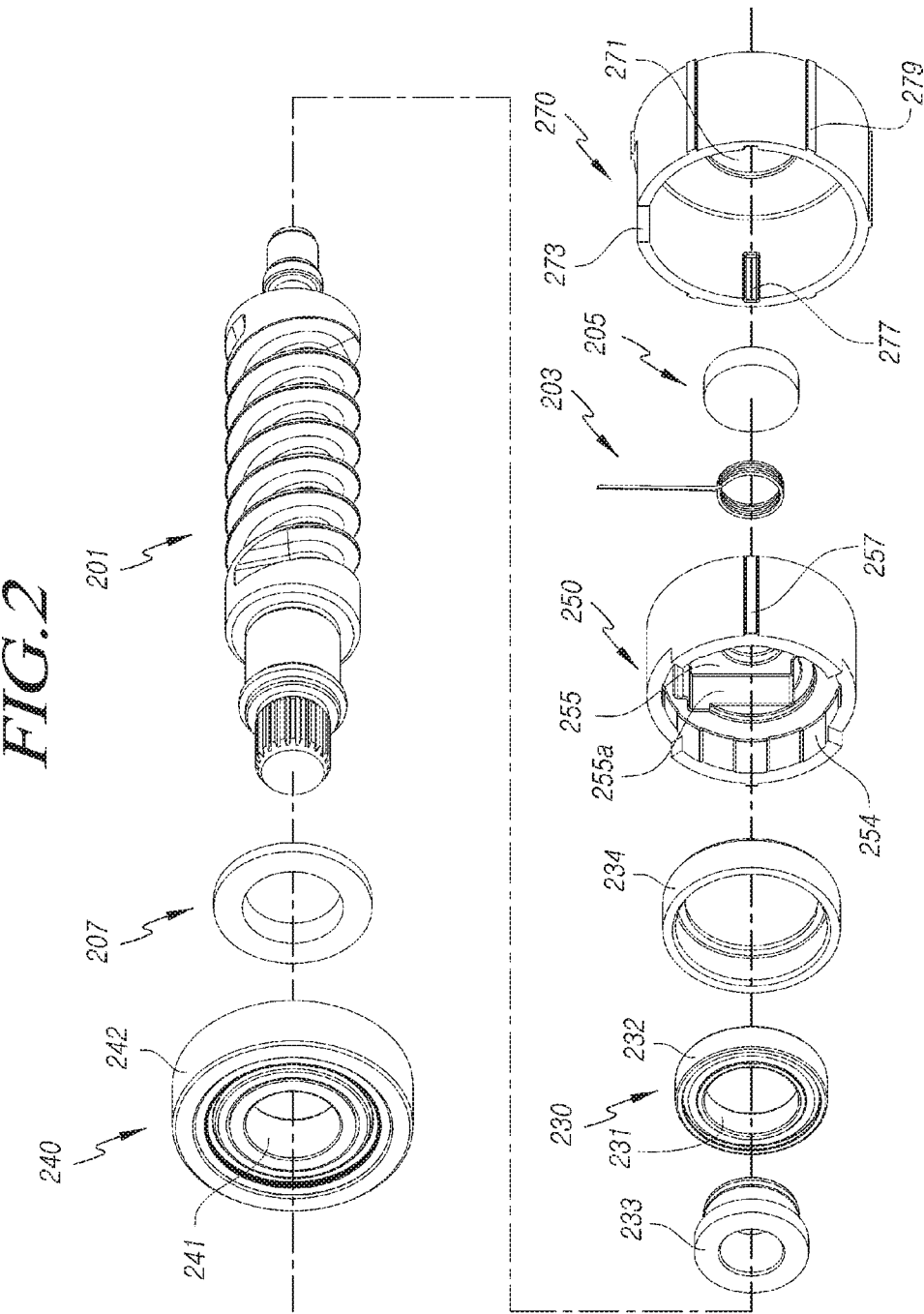
FIG. 2 is an exploded perspective view of a portion of a vehicular speed reducer according to embodiments of the present invention.
Figure 3:
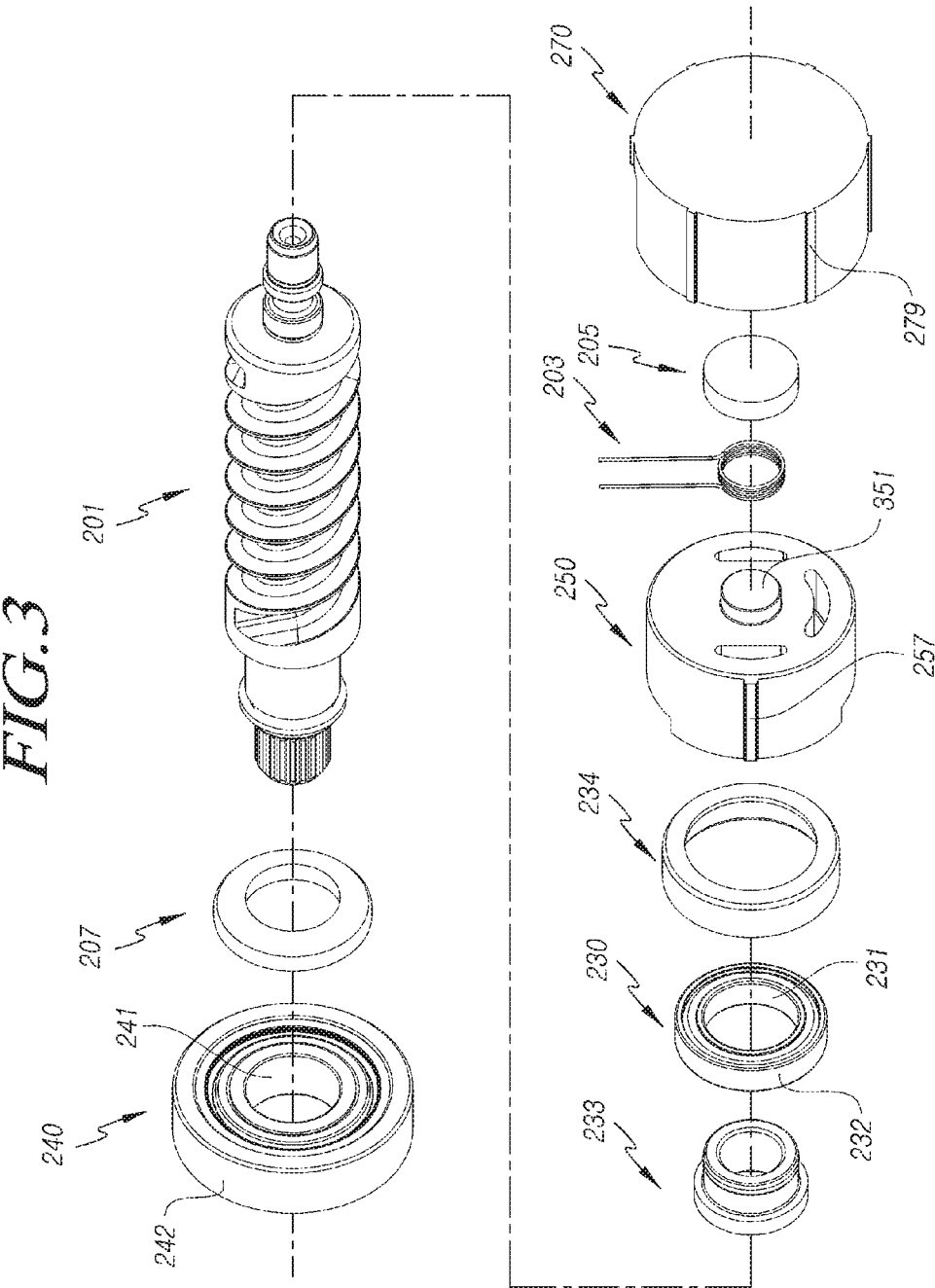
FIG. 3 is an exploded perspective view illustrating the portion of FIG. 2 viewed in the opposite direction.
Figure 4A:
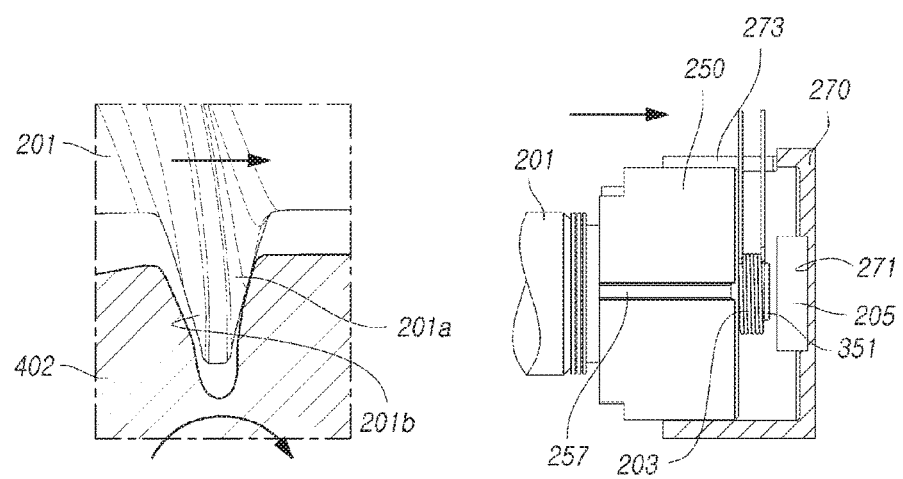
FIG. 4A and FIG. 4B are views illustrating an axial movement structure of a worm shaft of the vehicular speed reducer according to embodiments of the present invention.
Figure 4B:
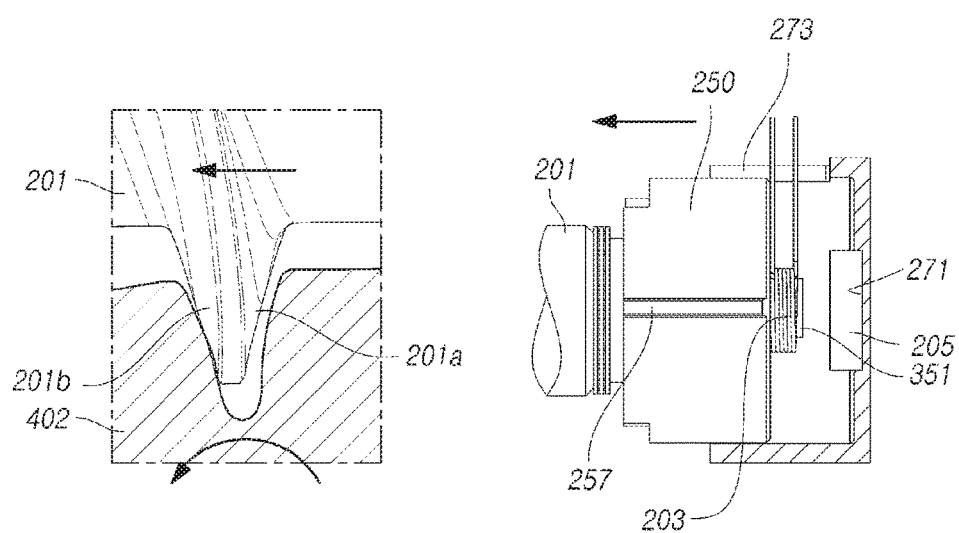
Figure 5:
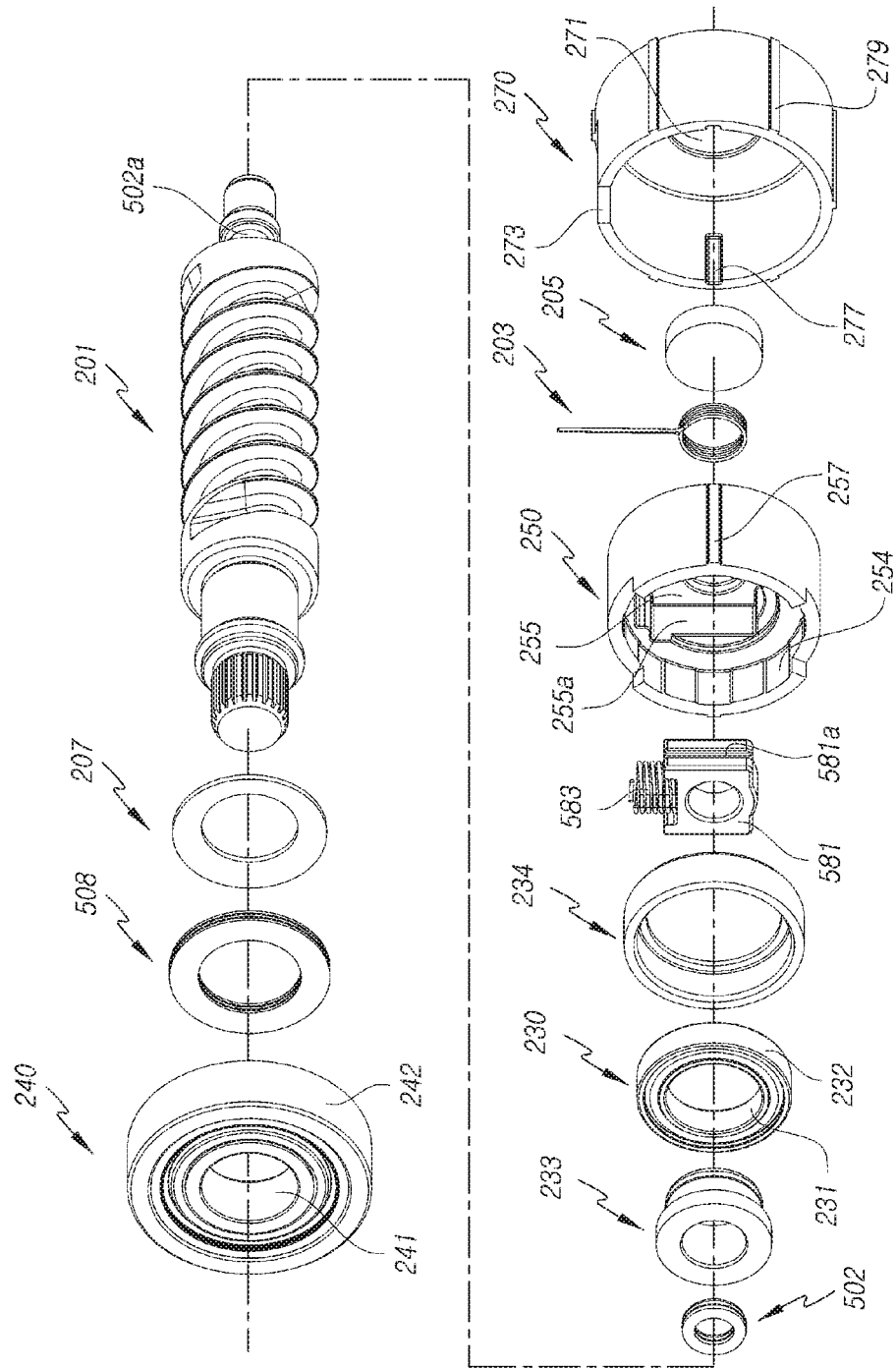
FIG. 5 is an exploded perspective view of a portion of a vehicular speed reducer according to embodiments of the present invention.
Figure 6:
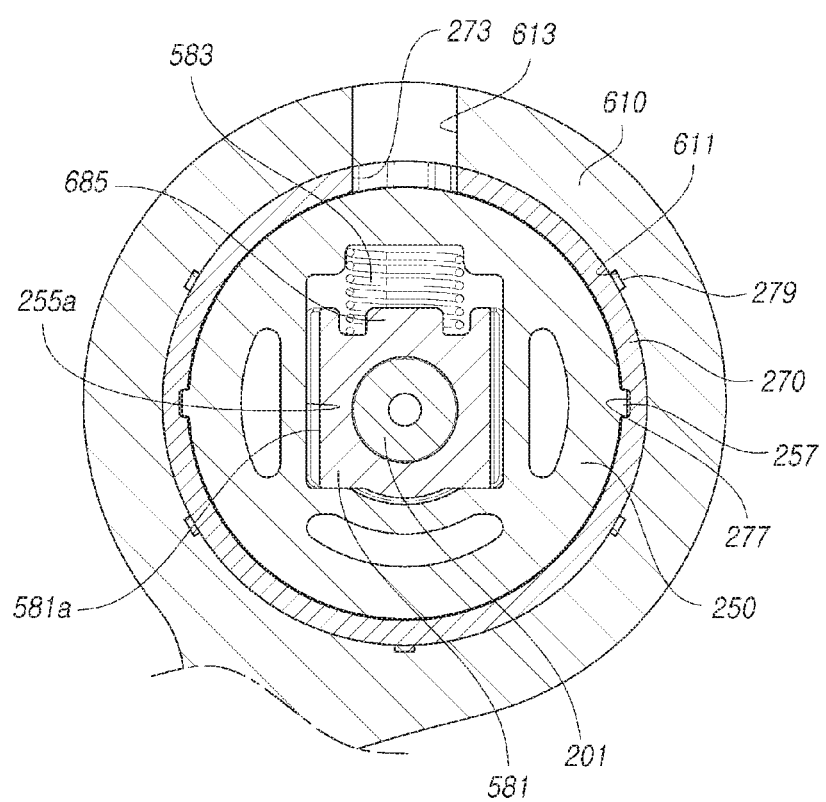
FIG. 6 is a cross-sectional view illustrating the portion of the vehicular speed reducer according to embodiments of the present invention.
Figure 7:
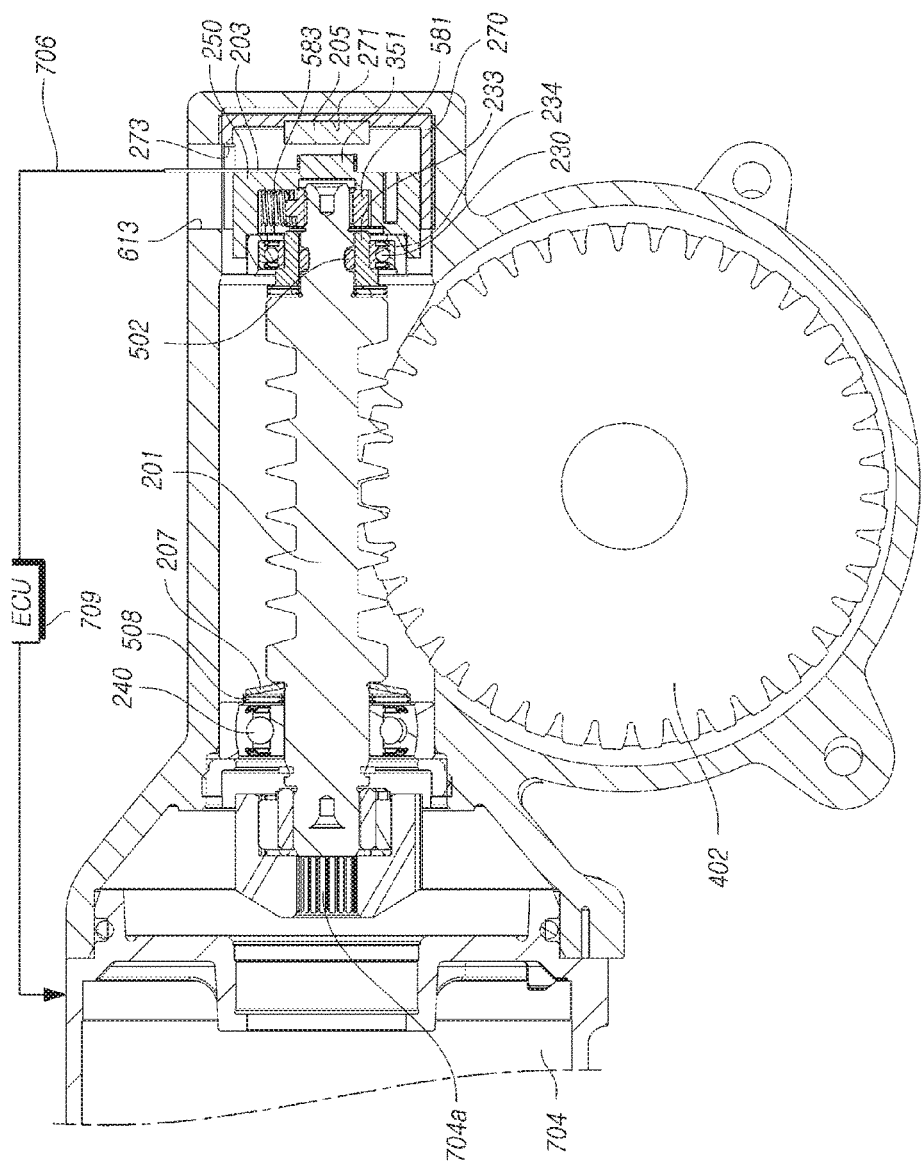
FIG. 7 is a cross view illustrating the portion of FIG. 6 viewed from a different direction.
Figure 8A:
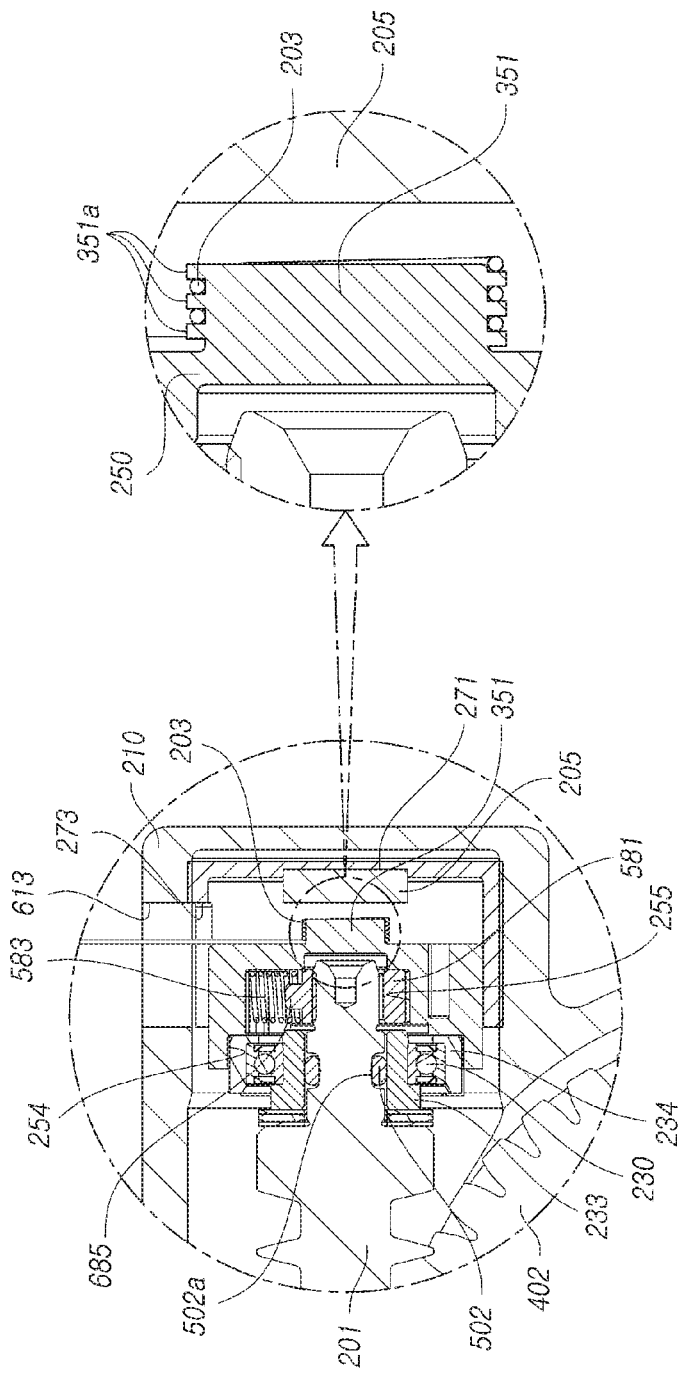
FIG. 8A and FIG. 8B are enlarged cross-sectional view illustrating a portion of FIG. 7 in an enlarged scale.
Figure 8B:
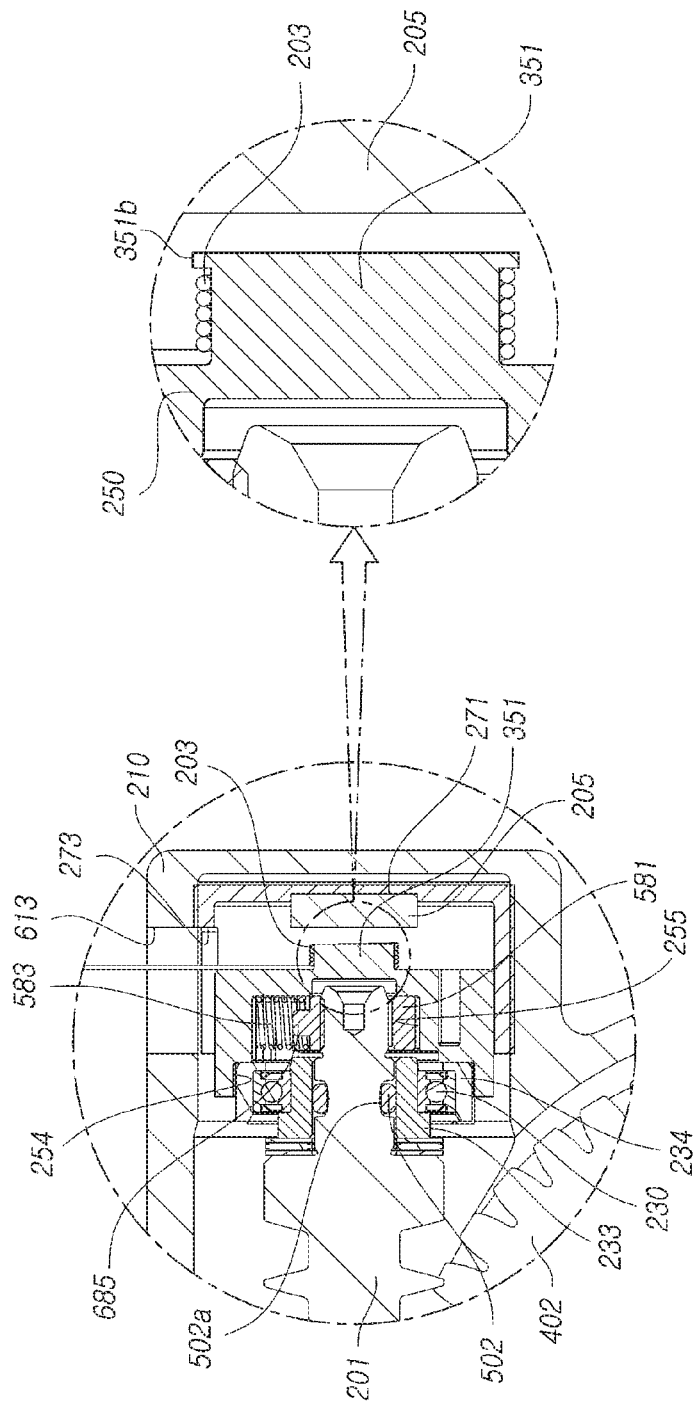

FIG. 2 is an exploded perspective view of a portion of a vehicular speed reducer according to embodiments of the present invention, and FIG. 3 is an exploded perspective view illustrating the portion of FIG. 2 viewed from the opposite direction. FIG. 4A and FIG. 4B are views illustrating an axial movement structure of a worm shaft of the vehicular speed reducer according to embodiments of the present invention, and FIG. 5 is an exploded perspective view of a portion of a vehicular speed reducer according to embodiments of the present invention. FIG. 6 is a cross-sectional view illustrating the portion of the vehicular speed reducer according to embodiments of the present invention, FIG. 7 is a cross-sectional view of FIG. 6 viewed from a different direction, and FIG. 8A and FIG. 8B are enlarged cross-sectional view illustrating a portion of FIG. 7 in an enlarged scale.

As illustrated in these drawings, according to the embodiments, the vehicular speed reducer includes: a gear housing 610 that encloses a worm wheel 402 and a worm shaft 201 and includes one of a first magnetic member 203 and a second magnetic member 205 configured to generate attractive force or repulsive force as a current is applied to a position facing the worm shaft 201 in an axial direction; a first bearing 230 coupled to an end of the worm shaft 201 at an opposite side to a coupling portion of a motor shaft 704a; and a moving member 250 coupled, at one side thereof, to an outer race of the first bearing 230 and including, at a remaining side thereof, a remaining one of the first and second magnetic members 203 and 205, so that the moving member 250 is axially moved according to the attractive force or the repulsive force.

The worm wheel 402 is meshed with the worm shaft 201, and is coupled to a steering shaft (not illustrated) that is connected to a steering wheel (not illustrated).

As described above, the worm shaft 201 is meshed with the worm wheel 402 and is provided inside the gear housing 610. The first bearing 230 and the second bearing 240 are coupled to opposite ends of the worm shaft 201, respectively, and are also coupled to the inner surface of the gear housing 610.

The first bearing 230, which is coupled to the end of the worm shaft 201 at a side away from the coupling portion of the motor shaft 704a, includes an inner race, an outer race, and balls, and the second bearing 240, which is coupled to the end of the worm shaft 201 at a side adjacent to the coupling portion of the motor shaft 704a, also includes an inner race an outer race, and a ball.

At this time, the first magnetic member 203 and the second magnetic member 205 (to be described later), in which generates attractive force or repulsive force therebetween when a current is applied to the inside of the gear housing 610, are provided so as to move the worm shaft 201 in the axial direction, and when the worm shaft 201 is rotated, the worm shaft 201 is moved in the axial direction so as to make the worm shaft 201 and the worm wheel 402 come into contact with each other in advance, thereby reducing the impact and rattling noise which are generated when the teeth of the worm shaft 201 and the worm wheel 402 collide with each other.

The first magnetic member 203 is formed of a coil and exhibits magnetism as a current is applied thereto and exhibits an N-pole or an S-pole depending on the direction in which the current is applied, and the second magnetic member 205 is formed of a permanent magnet that exhibits a single predetermined polarity.

Alternatively, although not illustrated in the drawings, the first magnetic member 203 and the second magnetic member 205 are both formed of coils so that, when a current is applied to each of the first magnetic member 203 and the second magnetic member 205, attractive force or repulsive force is generated between the first magnetic member 203 and the second magnetic member 205, and as a result the worm shaft 201 can be moved in the axial direction.

In addition, one of the first magnetic member 203 and the second magnetic member 205 is provided on a surface that axially faces the worm shaft 201 of the gear housing 610, so that the worm shaft 201 is moved in the axial direction according to the attractive force or the repulsive force.

In addition, the moving member 250, which is coupled to the outer race of the first bearing 230 so as to move the worm shaft 201 in the axial direction, is provided and the moving member 250 is opened at one side thereof such that the outer race of the first bearing 230 is coupled to the inner peripheral surface of the moving member 250 at the one side of the moving member 250 and the remaining one of the first magnetic member 203 and the second magnetic member 205 is provided at the other side of the moving member 250.

For the convenience of explanation of the present invention, a description will be made of an example in which the moving member 250 is provided with the first magnetic member 203 that is formed of a coil, and the gear housing 610 or the cover member 270 is provided with the second magnetic member 205 formed of a permanent magnet.

When the motor 704 is driven and thus the worm shaft 201 is rotated, the first magnetic member 203 and the second magnetic member 205 generate attractive force or repulsive force in consideration of the rotating direction of the worm shaft 201, thereby removing a clearance between the teeth of the worm shaft 201 and the teeth of the worm wheel 402.

That is, when one side of the teeth of the worm shaft 201 collides with the worm wheel 402 when the worm wheel 402 is rotated according to the rotation of the worm shaft 201, magnetic force is generated to move the worm shaft 201 to one side in the axial direction such that the teeth of the worm shaft 201 come into contact with the teeth of the worm wheel 402. The teeth of the worm shaft 201 and the teeth of the worm wheel 402 are brought into contact with each other in advance in this way, and as a result, it is possible to reduce rattling noise, which is generated when the worm shaft 201 collides with the worm wheel 402.

In addition, a cover member 270 may be further provided to be coupled to the inside of the gear housing 610 and to enclose the outer peripheral surface of the moving member 250, and the cover member 270 may include the second magnetic member 205 that is provided on the surface that faces, in the axial direction, the first magnetic member 203, which is provided in the moving member 250. Thus, the worm shaft 201, the first bearing 230, the moving member 250, the first magnetic member 203, the second magnetic member 205, and the cover member 270 may be modularized to be easily assembled with the gear housing 610.

A through-slit 273 is formed in the cover member 270 such that an electric wire 706, which applies a current to the first magnetic member 203, is connected to the first magnetic member 203 or such that the first magnetic member 203 protrudes to the outside through the through-slit 273. The through-slit 273 is formed to be elongated in the axial direction such that the first magnetic member 203 is movable in the axial direction together with the moving member 250 in the state in which the first magnetic member 203 penetrates the through-slit 273.

In addition, a through-hole 613 having an axially elongated shape is also formed in the gear housing 610 to correspond to the position of the through-slit 273 in the axial direction such that the end of the wire 706 or the first magnetic member 203 can penetrate the through-hole 613.

In addition, the moving member 250 is provided inside the cover member 270, and a guide projection 257 is formed to protrude on one of the outer peripheral surface and the inner peripheral surface of the cover member 270, and a guide groove 277, which is recessed to be elongated in the axial direction, is formed on the remaining one of the outer peripheral surface and the inner peripheral surface of the cover member 270.

The guide projection 257 is inserted into the guide groove 277 and guided along the guide groove 277 so that the guide projection 257 can be moved in the axial direction without causing the cover member 270 and the moving member 250 to rotate in relation to each other. In 2 the present invention, an example is illustrated in which the guide groove 277 is formed on the inner peripheral surface of the cover member 270 and a guide projection 257 is formed on the outer peripheral surface of the moving member 250.

A plurality of guide grooves 277 and a plurality of guide projections 257 may be formed on the cover member 270 and the moving member 250. The guide projections 257 may be formed on the inner peripheral surface of the cover member 270 and the guide grooves 277 may be formed on the outer peripheral surface of the moving member 250 so as to guide the movement of the moving member 250 in the axial direction.

Accordingly, the first bearing 230 coupled to the inner peripheral surface of the moving member 250 can stably support the rotation of the worm shaft 201.

In addition, in order to prevent the gear housing 610 and the cover member 270 from being rotated or axially moved relative to each other, a fixing projection 279 is formed to protrude on one of the outer peripheral surface of the cover member 270 and the inner peripheral surface of the gear housing 610 and a fixing groove 611, into which the fixing projection 279 is inserted, is formed on the other of the outer peripheral surface of the cover member 270 and the inner peripheral surface of the gear housing 610. Thus, the gear housing 610 and the cover member 270 are fixed to each other.

Accordingly, since the cover member 270 is fixed to the gear housing 610 even when attractive force or repulsive force is generated between the first magnetic member 203 and the second magnetic member 205, the moving member 250 can be smoothly moved in the axial direction from the cover member 270.

In this case, a plurality of fixing projections 279 and a plurality of fixing grooves 611 may be formed on the gear housing 610 and the cover member 270, respectively. The drawing illustrates, as an example, that the plurality of fixing projections 279 are formed on the outer peripheral surface of the cover member 270 and the plurality of fixing grooves 611 are formed on the inner peripheral surface of the gear housing 610.

Meanwhile, the first bearing 230 includes a first bearing holder 233 that is coupled between the inner race and the worm shaft 201, and a second bearing holder 234 that is coupled between the outer race and the moving member 250, thereby fixing the position of the first bearing 230.

The worm shaft 201 is coupled to the inner peripheral surface of the first bearing holder 233, and the inner race of the first bearing 230 is fixedly coupled to the outer peripheral surface of the first bearing holder 233 so as to be unmovable in the axial direction, thereby supporting the first bearing 230.

In addition, the worm shaft 201 is formed with an O-ring groove 502a into which an O-ring 502 is inserted so that the O-ring 502 is compressed between and elastically supports the outer peripheral surface of the worm shaft 201 and the inner peripheral surface of the first bearing holder 233, thereby reducing the vibration and noise of the worm shaft 201.

The outer race of the first bearing 230 is coupled to the inner peripheral surface of the second bearing holder 234, and the moving member 250 is fixedly coupled to the outer peripheral surface of the second bearing holder 234 so as not to move in the axial direction, thereby supporting the first bearing 230.

Particularly, the inner peripheral surface of the moving member 250, which is opened to one side, includes a support member-coupling portion 255 and a bearing-coupling portion 254 which is formed in a stepped manner to be increased in diameter from the support member-coupling portion 255, so that the second bearing holder 234 is supported by and coupled to a stepped portion between the support member-coupling portion 255 and the bearing-coupling portion 254.

Accordingly, the worm shaft 201, the first bearing holder 233, the first bearing 230, the second bearing holder 234, and the moving member 250 are coupled to each other to be moved together in the axial direction.

However, the worm shaft 201 and the first bearing holder 233 are coupled via the O-ring 502 so that the worm shaft 201 is moved toward or away from the worm wheel 402 while compressing the O-ring 502 within the first bearing holder 233, thereby reducing the vibration and noise of the worm shaft 201.

In addition, an elastic member 207 is provided on the end of the worm shaft 201 at a side adjacent to the coupling portion of the motor shaft 704a so as to support the side surface of the second bearing 240 and the worm shaft 201 in the axial direction.

When the worm shaft 201 is moved in the axial direction toward the motor 704, the elastic member 207 is gradually compressed to elastically support the worm shaft 201, and when the worm shaft 201 is moved in the axial direction away from the motor 704, the elastic member 207 is gradually restored so as to elastically support the worm shaft 201. Thus, the worm shaft 201 can be moved in the axial direction and no clearance occurs according to the movement, so that noise and vibration can be prevented from being generated.

In addition, the elastic supporting force of the elastic member 207 buffers the vibration, counteraction, impact, etc. of the worm shaft 201, which occur when the worm shaft 201 is moved in the axial direction and is rotated in the state where the teeth of the worm shaft 201 and the worm wheel 402 are in contact with each other.

One side of the elastic member 207 supports a radially protruding portion at the end of the worm shaft 201, which is adjacent to the coupling portion of the motor shaft 704a, and the other end of the elastic member 207 supports the side surface of the inner race of the second bearing 240. An axial support member 508 may further be provided between the other side of the elastic member 207 and the second bearing 240.

The axial support member 508 may be, for example, a thrust bearing or the like, as illustrated in the drawing. One side of the thrust bearing is coupled to the outer race of the second bearing 240 or the inner surface of the gear housing 610, and the other side of the thrust bearing supports the elastic member 207.

As the axial support member 508 is provided, the area to be elastically supported by the other side of the elastic member 207 can be increased, and as the axial support member 508 supports the rotation of the worm shaft 201 from the outer race of the second bearing 240, the axial movement of the worm shaft 201 can be more stably supported.

The axial movement of the worm shaft 201 according to the first magnetic member 203 and the second magnetic member 205 will be described in detail with reference to FIG. 4A and FIG. 4B. For the purpose of explanation, it will be described that with reference to the drawing, the worm shaft 201 moves to the right in order to rotate the worm wheel 402 in the clockwise direction, and the worm shaft 201 moves to the left in order to rotate the worm wheel 402 in the counterclockwise direction.

First, when the motor 704 is driven to rotate the worm wheel 402 in the clockwise direction as illustrated in FIG. 4A, the electric current is supplied to the first magnetic member 203 at the same time so as to cause the attractive force to be generated in the first magnetic member 203 with the second magnetic member 205, thereby moving the worm shaft 201 to the right. Thus, the right surface 201a of the teeth of the worm shaft 201 is brought into contact with the teeth of the worm wheel 402, thereby removing a clearance between the teeth of the worm shaft 201 and the teeth of the worm wheel 402.

That is, the worm shaft 201 is ready to move to the right in order to rotate the worm wheel 402 in the clockwise direction, and as the motor 704 is driven and current is simultaneously applied to the first magnetic member 203 in order to rotate the worm wheel 402 in the clockwise direction, the worm shaft 201 is moved to the right such that the right surface 201a of the teeth of the worm shaft 201 is brought into contact with the teeth of the worm wheel 402 in advance. Thus, a clearance between the teeth of the worm shaft 201 and the teeth of the worm wheel 402 is removed, and shock and noise are reduced.

On the contrary, when the motor 704 is driven to rotate the worm wheel 402 in the counterclockwise direction as illustrated in FIG. 4B, current is supplied at the same time to the first magnetic member 203 such that repulsive force is generated between the first magnetic member 203 and the second magnetic member 205, thereby moving the worm shaft 201 to the left, and as a result, the left surface 201b of the teeth of the worm shaft 201 is brought into contact with the teeth of the worm wheel 402, thereby removing a clearance between the teeth of the worm shaft 201 and the teeth of the worm wheel 402.

That is, the worm shaft 201 is ready to move to the left in order to rotate the worm wheel 402 in the counterclockwise direction, and as the motor 704 is driven and current is simultaneously applied to the first magnetic member 203 in order to rotate the worm wheel 402 in the counterclockwise direction, the worm shaft 201 is moved to the left such that the left surface 201b of the teeth of the worm shaft 201 is brought into contact with the teeth of the worm wheel 402 in advance. Thus, a clearance between the teeth of the worm shaft 201 and the teeth of the worm wheel 402 is removed, and shock and noise are reduced.

Since the worm shaft 201 moves in the axial direction while compressing the elastic member 207 and the clearance between the teeth of the worm shaft 201 and the teeth of the worm wheel 402 is removed, the noise, which occurs due to the impact, which is applied to the worm wheel 402 by the worm shaft 201 during the rotation, can be reduced. Further, the noise, which is generated as the worm shaft 402 is vibrated and thus collides with the worm wheel 402, can be reduced and the impact transmitted from the worm wheel 402 can be absorbed. As a result, rattling noise and vibration can be reduced.

Here, the direction in which the current is supplied to the first magnetic member 203 depends on the driving of the motor 704. For example, an electronic control unit 709 uses a direction control signal of the control signal among the signals of the motor 704 so as to supply current in the manner of controlling the direction in which the current is supplied to the first magnetic member 203.

In other words, when the motor 704 rotates in one direction, the electronic control unit 709 applies the current to the first magnetic member 203 in one direction, thereby removing the clearance between the teeth of the worm shaft 201 and the teeth of the worm wheel 402, and on the other hand, when the motor 704 reversely rotates in the other direction, the electronic control unit 709 applies the current to the second magnetic member 205 in the other direction, thereby removing the clearance between the teeth of the worm shaft 201 and the teeth of the worm wheel 402.

In addition, as illustrated in FIGS. 5 to 8, a support member 581 and a spring member 583 are provided to the support member-coupling portion 255 of the moving member 250 so as to bias the worm shaft 201 toward the worm wheel 402.

The support member 581 is coupled to the end of the worm shaft 201 at the opposite side to the coupling portion of the motor shaft 704a and is provided inside the support member-coupling portion 255 so as to be movable in the direction toward the worm wheel 402 or away from the worm wheel 402.

A pair of first plane portions 255a are formed in the support member-coupling portion 255 to face each other, and a pair of second plane portions 581a are also formed on the outer surface of the support member 581 to correspond to the first plane portions 255a, so that the support member 581 is guided and moved inside the support member-coupling portion 255 in the direction toward the worm wheel 402 or away from the worm wheel 402.

In addition, the support member 581 is provided with a guide portion 685 formed to protrude upward so that the lower end of the spring member 583 is engaged with the guide portion 685, and the upper end of the spring member 583 supports the support member-coupling portion 255 of the moving member 250, so that the worm shaft 201 is biased toward the worm wheel 402 by the elastic restoring force of the spring member 583.

In addition, the worm shaft 201 is coupled to the first bearing holder 233 via the O-ring 502, and since the spring member 583 applies elastic restoring force thereto, the worm shaft 201 may move by the clearance between the worm shaft 201 and the first bearing holder 233 in the direction toward or away from the worm wheel 402.

In addition, the first magnetic member 203 and the second magnetic member 205 are respectively coupled to the moving member 250 and the cover member 270, and must be fixed so as not to be disengaged even if attractive force or repulsive force occurs.

The first magnetic member 203 is coupled to a surface of the moving member 250, which faces the cover member 270, and a protrusion 351 is formed on the surface of the moving member 250, which faces the cover member 270, to protrude in the axial direction, so that the first magnetic member 203 is wound around and coupled to the protrusion 351.

In addition, as illustrated in FIG. 8A, spiral engagement portions 351a are formed on the outer peripheral surface of the protrusion 351 to protrude radially and along a spiral line, so that the first magnetic member 203 is provided in and wound along the grooves between the spiral engagement portions 351a, and as a result, the first magnetic member 203 is fixed to the protrusion 351.

In addition, as illustrated in FIG. 8B, an engagement portion 351b is formed on the protrusion 351 to protrude radially from the protruding end of the protrusion 351, and the first magnetic member 203 is wound between the surface of the moving member 250, which faces the cover member 270 and the engagement portion 351b, so that the first magnetic member 203 is prevented from being released.

As a result, even if attractive force is generated between the second magnetic member 205 and the first magnetic member 203, the spiral engagement portion 351a or the engagement portion 351b supports the first magnetic member 203 such that the first magnetic member 203 is blocked not to be released toward the second magnetic member 205.

In addition, the second magnetic member 205 is coupled to a surface of the cover member 270, which faces the moving member 250, and a coupling groove 271 is formed on the surface of the cover member 270, which faces the moving member 250, so that the second magnetic member 205 is inserted into and coupled to the coupling groove 271.

At this time, when the second magnetic member 205 is coupled to the coupling groove 271, the second magnetic member 205 is coupled while widening the coupling groove 271 so that the second magnetic member 205 is fixedly coupled to the cover member 270.

Alternatively, each of the outer peripheral surfaces of the second magnetic member 205 and the coupling groove 271 is threaded, and the second magnetic member 205 is screw-coupled to the coupling groove 271. Due to the screw-coupling between the second magnetic member 205 and the coupling groove 271, the second magnetic member 205 is fixed to the coupling groove 271 and is prevented from being released from the coupling groove 271.

According to the embodiments of the present invention, which have the above-described shapes and configurations described above, even if a clearance exists between a worm shaft and a worm wheel, the clearance between the worm shaft and the worm wheel is removed at the time of motor driving, so that noise, which is generated when the worm shaft collides with the teeth of the worm wheel during the rotation, can be prevented from being generated, vibration, which is transmitted to the worm wheel due to vibration of the worm shaft, is reduced and rattling noise is reduced, so that an uncomfortable feeling of a driver can be eliminated, and the worm wheel and the worm shaft are stably engaged with each other, so that torque can be smoothly transmitted.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A speed reducer for a vehicle, the speed reducer comprising:
   a gear housing configured to enclose a worm wheel and a worm shaft;
   a first magnetic member and a second magnetic member configured to generate attractive force or repulsive force therebetween when current is applied to a position facing the worm shaft in an axial direction, wherein the first magnetic member is wound around and coupled to a circle-shaped protrusion which is formed in the axial direction and on a surface of a moving member;
   a first bearing coupled to an end of the worm shaft at an opposite side to a motor shaft-coupling portion; and
   the moving member coupled, at one side thereof, to an outer race of the first bearing and including the circle-shaped protrusion, a circumferential surface of which is configured to be used for winding a coil of the first magnetic member, wherein the circle-shaped protrusion which the coil of the first magnetic member is wound around is disposed to face the second magnetic member by a predetermined distance so that the moving member is axially moved according to the attractive force or the repulsive force.

2. The speed reducer of claim 1, wherein the first magnetic member is forming of the coil to exhibit magnetism when current is applied thereto, and the second magnetic member is formed of a permanent magnet.

3. The speed reducer of claim 2, wherein the magnetism of the first magnetic member is changed in direction depending on the current that is applied to correspond to a rotating direction of the motor.

4. The speed reducer of claim 2, further comprising:
a cover member coupled inside the gear housing and opened at one side thereof so as to enclose an outer peripheral surface of the moving member, the second magnetic member being provided on a surface of the cover member, which faces the moving member in the axial direction.

5. The speed reducer of claim 4, further comprising:
a guide projection formed to protrude on one of the outer peripheral surface of the moving member and an inner peripheral surface of the cover member; and
a guide groove formed on a remaining one of the outer peripheral surface of the moving member and the inner peripheral surface of the cover member to be elongated in the axial direction, so that the guide projection is guided in the guide groove.

6. The speed reducer of claim 5, further comprising:
a fixing projection formed to protrude on one of an outer peripheral surface of the cover member and an inner peripheral surface of the gear housing; and
a fixing groove formed on a remaining one of the outer peripheral surface of the cover member and the inner peripheral surface of the gear housing, the fixing projection being inserted into the fixing groove.

7. The speed reducer of claim 4, further comprising:
a coupling groove formed to be recessed on a remaining side of the moving member or the surface of the cover member, which faces the moving member, the second magnetic member being coupled to the coupling groove.

8. The speed reducer of claim 7, wherein the second magnetic member is screw-coupled to the coupling groove.

9. The speed reducer of claim 4, wherein the cover member has a through-slit formed be opened to one side end of the cover member, which encloses the moving member, so that the first magnetic member protrudes through the through-slit.

10. The speed reducer of claim 9, wherein the gear housing has a through-hole formed in an elongated shape in the axial direction at a position corresponding to the through-slit, and the first magnetic member protrudes outward through the through-slit and the through-hole.

11. The speed reducer of claim 1, further comprising:
a step portion formed on an end of the worm shaft adjacent to the motor shaft-coupling portion to protrude in a radial direction;
a second bearing coupled at a position spaced apart from the step portion; and
an elastic member provided between the step portion and the second bearing.

12. The speed reducer of claim 11, further comprising:
an axial support member coupled between the second bearing and the elastic member so as to increase an area elastically supported by the elastic member.

13. The speed reducer of claim 1, wherein the circle-shaped protrusion includes an engagement portion formed to radially protrude at an end of the circle-shaped protrusion so as to prevent the first magnetic member, which is wound around and coupled to the protrusion, from being released from the circle-shaped protrusion.

14. The speed reducer of claim 1, further comprising:
a support member into which the end of the worm shaft at the opposite side to the motor shaft-coupling portion is inserted such that the support member is moved toward or away from the worm wheel in an inside of the moving member; and a spring member configured to elastically support the support member and the inside of the moving member between the support member and the inside of the moving member.

* * * * *